US008134272B2

(12) United States Patent
Okamoto et al.

(10) Patent No.: US 8,134,272 B2
(45) Date of Patent: Mar. 13, 2012

(54) DYNAMOELECTRIC MACHINE

(75) Inventors: Shogo Okamoto, Chiyoda-ku (JP);
Toshiaki Kashihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 404 days.

(21) Appl. No.: 12/307,480

(22) PCT Filed: Jul. 26, 2006

(86) PCT No.: PCT/JP2006/314774
§ 371 (c)(1),
(2), (4) Date: Jan. 23, 2009

(87) PCT Pub. No.: WO2008/012880
PCT Pub. Date: Jan. 31, 2008

(65) Prior Publication Data
US 2009/0200887 A1 Aug. 13, 2009

(51) Int. Cl.
*H02K 3/28* (2006.01)
(52) U.S. Cl. ............ 310/216.004; 310/216.008; 310/184
(58) Field of Classification Search .................... 310/43, 310/184, 195, 216.004, 216.008, 216.018, 310/216.111, 216.114, 216.118
See application file for complete search history.

(56) References Cited

U.S. PATENT DOCUMENTS

| 5,955,810 | A | * | 9/1999 | Umeda et al. ............... 310/208 |
| 6,121,699 | A | * | 9/2000 | Kashihara et al. ........ 310/68 D |
| 6,337,529 | B1 | | 1/2002 | Higashino et al. |
| 6,429,552 | B2 | * | 8/2002 | Asao et al. ................... 310/64 |
| 6,455,972 | B1 | * | 9/2002 | Asao et al. ................. 310/184 |
| 6,501,205 | B1 | * | 12/2002 | Asao et al. ................. 310/184 |
| 6,700,239 | B2 | * | 3/2004 | Asao et al. ................... 310/59 |
| 6,888,281 | B2 | * | 5/2005 | Koike et al. ............... 310/179 |
| 7,012,348 | B2 | * | 3/2006 | Kashihara et al. .......... 310/64 |
| 7,049,726 | B2 | * | 5/2006 | Nakahara et al. ...... 310/216.063 |
| 2002/0047483 | A1 | | 4/2002 | Oohashi et al. |

FOREIGN PATENT DOCUMENTS

JP 62-088442 U 6/1987
(Continued)

OTHER PUBLICATIONS

Japanese Office Action issued in Application No. 2006-549732 dated Dec. 20, 2011.

*Primary Examiner* — Quyen Leung
*Assistant Examiner* — Naishadh Desai
(74) *Attorney, Agent, or Firm* — Sughrue Mion, PLLC

(57) ABSTRACT

The present invention provides a dynamoelectric machine that suppresses the occurrence of insulation failure that accompanies oxidation of a stator core without lowering output, and that also suppresses stator temperature increases by transferring heat that is generated in a stator coil efficiently to a frame.

A stator core is configured by laminating and integrating thin magnetic plates, and has an outer circumferential surface that has a cylindrical surface, and receiving grooves are formed on inner circumferences of openings of frames. The receiving grooves are constituted by: an annular axial surface that is constituted by a flat surface that is perpendicular to a central axis of the stator core; and a radial surface that is constituted by a cylindrical surface that is centered around the central axis. Metal surfaces of the thin magnetic plates at two axial ends of the stator core are held between each of the axial surfaces of the pair of frames in a state of close contact around an entire circumference.

5 Claims, 8 Drawing Sheets

FOREIGN PATENT DOCUMENTS

| | | | |
|---|---|---|---|
| JP | 04-150746 A | | 5/1992 |
| JP | 04150746 A | * | 5/1992 |
| JP | 10-094200 A | | 4/1998 |
| JP | 11008138 | | 1/1999 |
| JP | 11318047 | | 11/1999 |
| JP | 11332140 | | 11/1999 |
| JP | 2001-112197 A | | 4/2001 |
| JP | 2001157390 | | 6/2001 |
| JP | 2001-211619 A | | 8/2001 |
| JP | 2001-275283 A | | 10/2001 |
| JP | 2002-153008 A | | 5/2002 |
| JP | 2002-186232 A | | 6/2002 |
| JP | 2003333771 | | 11/2003 |
| JP | 2004112961 | | 4/2004 |

* cited by examiner

DYNAMOELECTRIC MACHINE

TECHNICAL FIELD

The present invention relates to a dynamoelectric machine such as a generator, an electric motor, or a generator-motor, etc., that can be mounted to a passenger car, or a truck, etc.

BACKGROUND ART

In a first conventional automotive alternator, notches that have L-shaped cross sections for interfitting are formed by cutting, etc., on outer circumferential portions of two axial end surfaces of a cylindrical stator core so as to have ring shapes. A pair of bowl-shaped frames is fitted together with the notches on the stator core in a press-fitted state from two axial ends such that the stator is interlocked in the pair of frames (see Patent Literature 1, for example).

In a second conventional automotive alternator, a stator core is prepared into a cylindrical shape by coiling up and laminating a strip-shaped steel plate into a helical shape. A groove-shaped recess portion that extends axially is disposed on an outer circumferential portion of the stator core. Two axial end surfaces of the stator core are formed so as to have flat surfaces. A pair of bowl-shaped frames is placed on the two axial end surfaces of the stator core from two axial ends, and are fastened using a through bolt that is disposed in the recess portion. Thus, the stator core is pressed and held by the pair of frames from the two axial ends (see Patent Literature 2, for example).

Patent Literature 1: Japanese Utility Model Non-Examined Publication No. SHO 62-88442 (Gazette)

Patent Literature 2: Japanese Patent Laid-Open No. 2002-186232 (Gazette)

DISCLOSURE OF THE INVENTION

Problem to be Solved by the Invention

In the first conventional automotive alternator, because the stator core and the frames are interlocked, identical degrees of roundness and concentricity are required on the interlocking portions of the two. Specifically, the outer circumferential surfaces of the notches that have L-shaped cross sections that are formed on the outer circumferential portions of the stator core and the inner circumferential surfaces of the opening edge portions of the frames that are interlocked therewith are required to have identical degrees of roundness and concentricity. However, it has been difficult to prepare the outer circumferential surfaces of the notches of the stator core and the inner circumferential surfaces of the opening edge portions of the frames so as to have identical degrees of roundness and concentricity. Thus, minute gaps have arisen on the interlocking portions between the outer circumferential surfaces of the notches of the stator core and the inner circumferential surfaces of the opening edge portions of the frames.

In this kind of automotive alternator, in order to cool a stator coil that constitutes a heat-generating part, air discharge apertures are formed on the frames in close proximity to coil ends of the stator coil. Thus, during operation of a vehicle, salt water, mud, etc., that has penetrated inside the frames through the air discharge apertures may enter through the gaps in the interlocking portions between the stator core and the frames. Because the salt water, mud, etc., accumulates in the gaps in the interlocking portions and accelerates oxidation of the stator core, and because the interlocking portions are in close proximity to the coil ends of the stator coil, leak paths form easily between the stator coil, which generates phase currents, and the frames, which constitute ground, making insulation failure more likely to occur.

In order to solve the above problems, it is conceivable that interference in the interlocking portions might be increased. In other words, the interfitting force between the stator core and the frames can be increased by increasing the interference in the interlocking portions, thereby reducing the gaps in the interlocking portions. However, frame rigidity is required to withstand the larger interfitting force, giving rise to increases in the size of the frames and increases in the size of the automotive alternator.

In the second conventional automotive alternator, because the stator core is pressed and held by the pair of frames using the fastening force of the through bolt, gaps are less likely to arise in the abutted portions between the stator core and the frames, suppressing the occurrence of insulation failure such as that described above. However, because the recess portion is formed on the outer circumferential portion of the stator core so as to extend axially, one problem has been that magnetic resistance is increased in the magnetic circuit, leading to declines in output.

In automotive alternators, since stator temperature increases also lead to declines in output, it is necessary to radiate heat that is generated in the stator coil efficiently. However, in the conventional techniques that are described above, no consideration at all has been given to suppressing stator temperature increases by radiating the heat that is generated in the stator coil efficiently.

The present invention aims to solve the above problems and an object of the present invention is to provide a dynamoelectric machine that suppresses the occurrence of insulation failure that accompanies oxidation of a stator core without lowering output, and that also suppresses stator temperature increases by transferring heat that is generated in a stator coil efficiently to a frame.

Means for Solving the Problem

In order to achieve the above object, according to one aspect of the present invention, there is provided a dynamoelectric machine including: a stator that has: a cylindrical stator core in which slots that open radially inward are arrayed circumferentially; and a stator coil that is installed in the slots; a pair of frames that are each formed so as to have a bowl shape, and in each of which a receiving groove is formed around an entire circumference on an inner circumference of an opening of the bowl shape, outer circumferential portions at two axial ends of the stator core fitting together with the receiving grooves so as to be held therebetween; a rotor that is disposed inside the stator core so as to be coaxial with the stator core and that is rotatably supported by the pair of frames; a plurality of through bolts that are arrayed circumferentially radially outside the stator core so as to have an axial direction that is parallel to a central axis of the stator core, and that fasten and integrate the pair of frames that hold the stator core; and a cooling fan that is fixed to at least one axial end surface of the rotor. An air intake aperture is disposed through an end surface of the pair of frames near the cooling fan, and an air discharge aperture is disposed through a side surface of the pair of frames near the cooling fan. In addition, the stator core is configured by laminating and integrating thin magnetic plates, and has an outer circumferential surface that has a cylindrical surface, and the receiving groove is constituted by: an annular axial surface that is constituted by a flat surface that is perpendicular to the central axis of the stator core; and a radial surface that is constituted by a cylindrical surface that is centered around the central axis. Metal surfaces of the thin magnetic plates at two axial ends of the stator core are held between each of the axial surfaces of the pair of frames in a state of close contact around an entire circumference.

Effects of the Invention

According to the present invention, because the stator core has an outer circumferential surface that has a cylindrical surface, the magnetic path cross-sectional area of the core back that constitutes a magnetic circuit is not decreased, suppressing declines in output that accompany increases in magnetic resistance. Because the two axial end surfaces of the stator core are pressed and held between each of the axial surfaces of the receiving grooves of the pair of frames in a state of close contact around the entire circumference, gaps between the end surfaces of the stator core and the axial surfaces of the receiving grooves are eliminated, suppressing penetration of salt water, mud, etc., between the end surfaces of the stator core and the axial surfaces of the receiving grooves. Thus, the occurrence of insulation failure that results from salt water, mud, etc., accumulating between the end surfaces of the stator core 15A and the axial surfaces 21a can be suppressed. Because the end surfaces of the stator core and the axial surfaces of the receiving grooves contact each other at metal surfaces, heat from the stator coil is transferred to the frames efficiently through the stator core. Thus, heat that is generated in the stator coil is radiated efficiently from the frames, suppressing stator temperature increases.

BEST MODE FOR CARRYING OUT THE INVENTION

Embodiment 1

Figure 1:
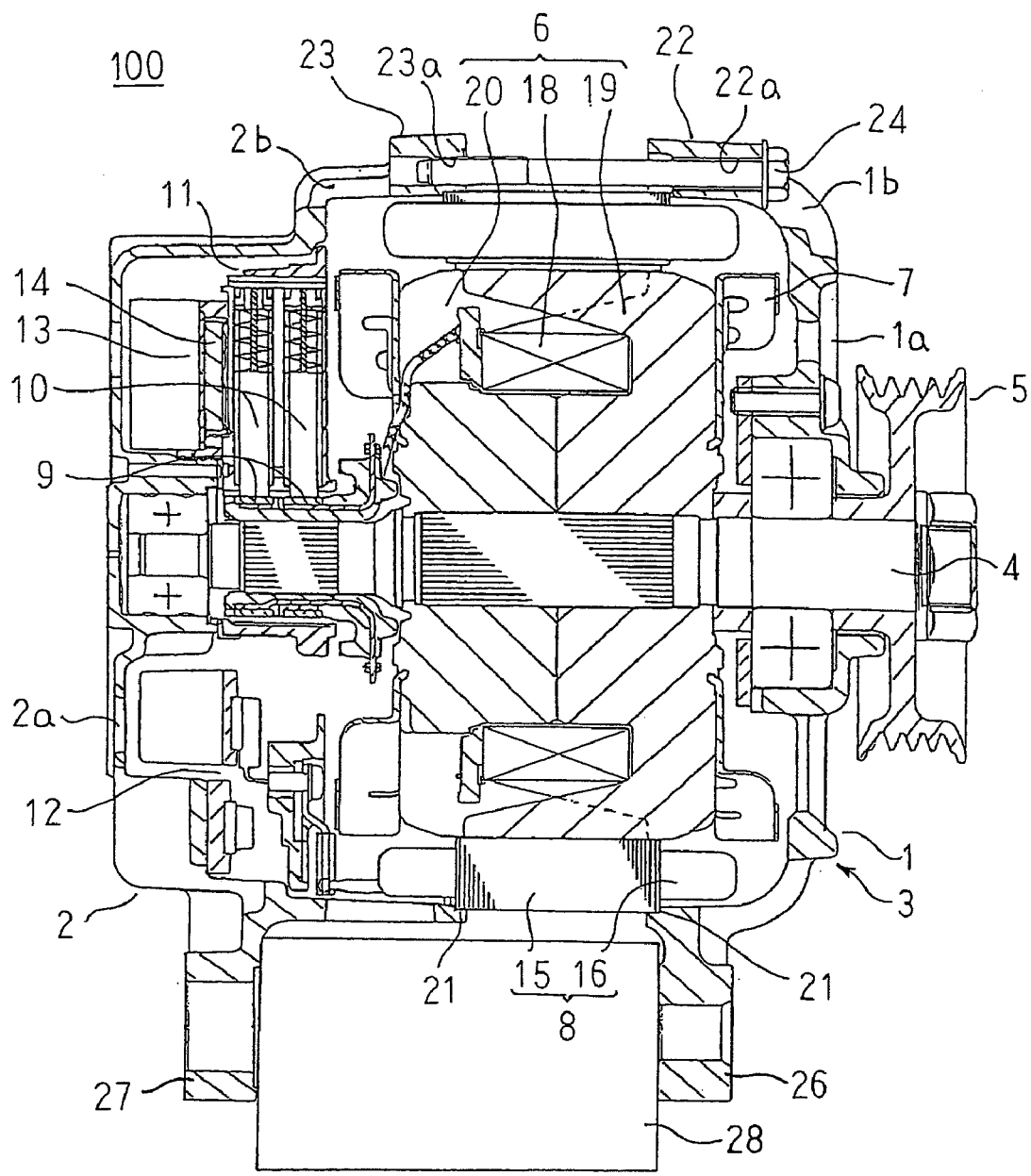
FIG. 1 is a longitudinal section that shows an automotive alternator according to Embodiment 1 of the present invention.
Figure 2:
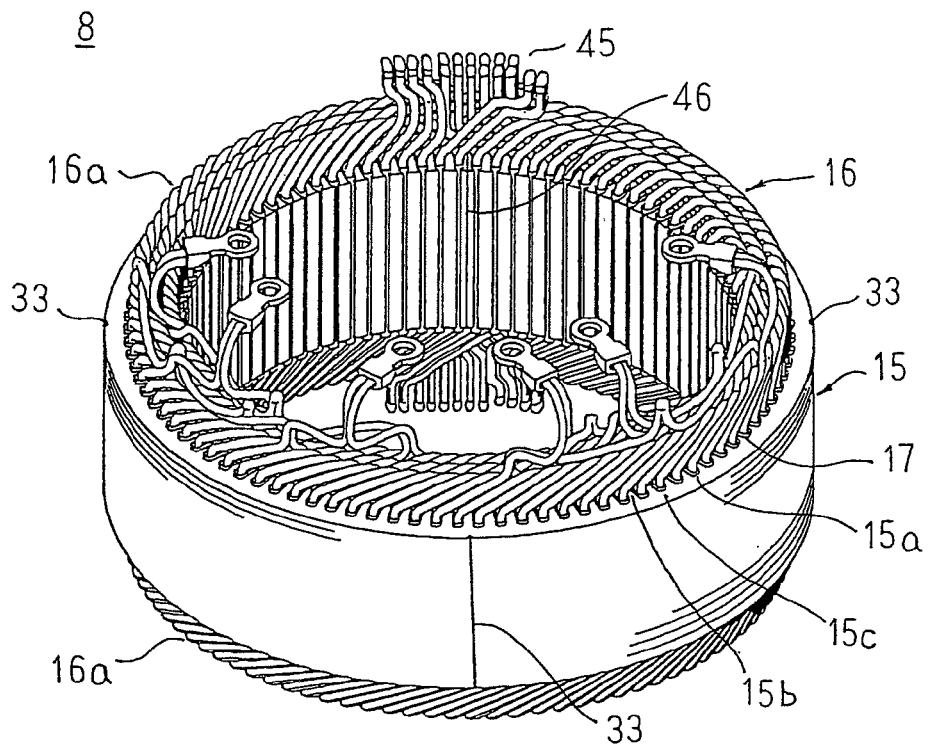
FIG. 2 is a perspective that shows a stator that can be used in the automotive alternator according to Embodiment 1 of the present invention.
Figure 3:
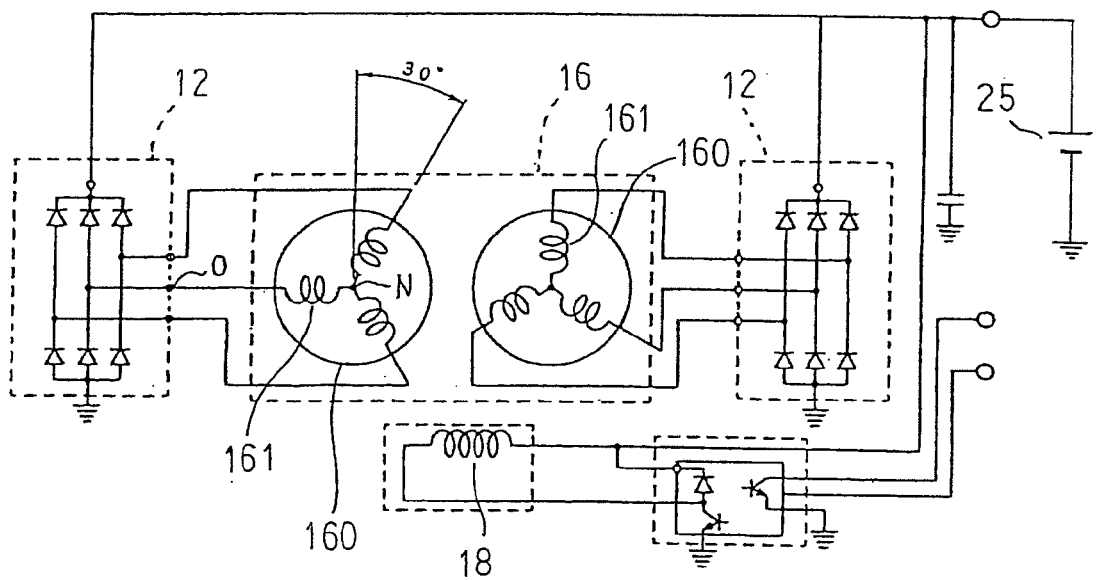
FIG. 3 is an electrical circuit diagram for the automotive alternator according to Embodiment 1 of the present invention.
Figure 4:
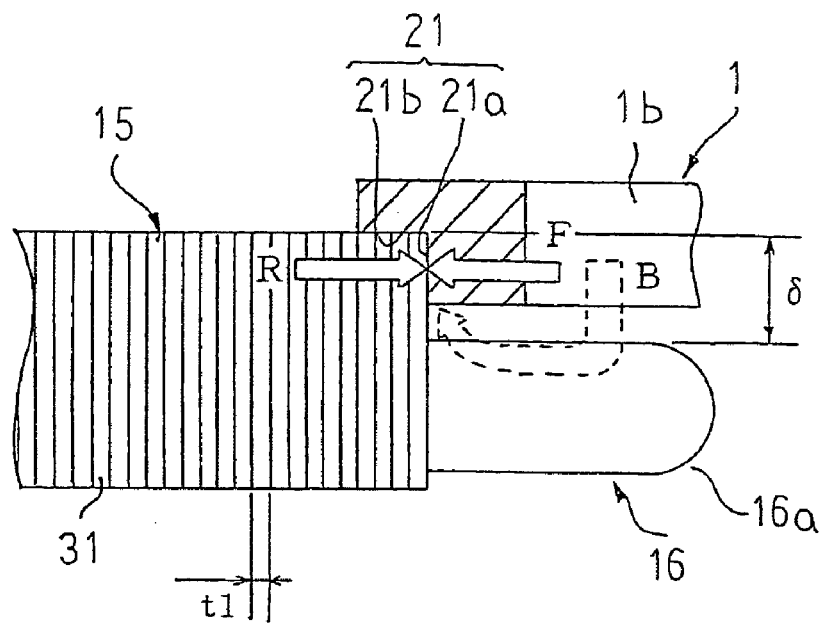
FIG. 4 is a partial cross section that explains a stator fixing construction in the automotive alternator according to Embodiment 1 of the present invention.

FIG. 1 is a longitudinal section that shows an automotive alternator according to Embodiment 1 of the present invention, FIG. 2 is a perspective that shows a stator that can be used in the automotive alternator according to Embodiment 1 of the present invention, FIG. 3 is an electrical circuit diagram for the automotive alternator according to Embodiment 1 of the present invention, and FIG. 4 is a partial cross section that explains a stator fixing construction in the automotive alternator according to Embodiment 1 of the present invention.

In FIGS. 1 through 4, an automotive alternator 100 includes: a case 3 that is constituted by a front bracket 1 and a rear bracket 2 that function as frames that are each approximately bowl-shaped and made of aluminum; a shaft 4 that is rotatably supported by the case 3; a pulley 5 that is fixed to an end portion of the shaft 4 that projects outward at a front end of the case 3; a rotor 6 that is fixed to the shaft 4 so as to be accommodated inside the case 3; fans 7 that are fixed to two axial end surfaces of the rotor 6; a stator 8 that is fixed to an inner wall surface of the case 3 so as to surround an outer circumference of the rotor 6; slip rings 13 that are fixed to a rear end of the shaft 4 so as to supply electric current to the rotor 6; a pair of brushes 10 that are disposed inside the case 3 so as to slide on the slip rings 9; a brush holder 11 that houses the brushes 10; rectifiers 12 that are electrically connected to the stator 8 so as to rectify alternating current that is generated in the stator 8 into direct current; a heatsink 13 that is fitted into the brush holder 11; and a regulator 14 that is fixed adhesively to the heatsink 13, and that adjusts magnitude of alternating voltage that is generated in the stator 8.

The rotor 6 includes: a field winding 18 that generates magnetic flux on passage of electric current; and a pair of first and second pole cores 19 and 20 that are disposed so as to cover the field winding 18, and in which magnetic poles are formed by the magnetic flux.

The stator 8 includes: a cylindrical stator core 15; and a stator coil 16 that is installed in the stator core 15. Slots 15a that extend axially are disposed in the stator core 15 at a uniform angular pitch circumferentially at a ratio of two slots per phase per pole such that openings thereof face an inner circumferential side. Insulators 17 are mounted inside the slots 15a so as to ensure insulation between the stator core 15 and the stator coil 16. The stator coil 16 is constituted by two three-phase alternating-current windings 160 that are each formed by wye-connecting three phase windings 161. The two three-phase alternating-current windings 160 are respectively connected to the rectifiers 12.

Receiving grooves 21 that have L-shaped cross sections are formed on inner circumferences of opening edge portions of the front bracket 1 and the rear bracket 2 so as to have annular shapes. A plurality of front-end flange portions 22 and rear-end flange portions 23 are disposed so as to project radially outward and face each other on outer circumferences of the opening edge portions of the front bracket 1 and the rear bracket 2. Bolt apertures 22a are disposed on the front-end flange portions 22, and threaded apertures 23a are disposed on the rear-end flange portions 23. Moreover, the receiving grooves 21 that have L-shaped cross sections have: annular axial surfaces 21a that are constituted by flat surfaces that are perpendicular to a central axis of the shaft 4; and radial surfaces 21b that are constituted by cylindrical surfaces that are centered around the central axis of the shaft 4.

Two axial ends of the stator core 15 are fitted together with the receiving grooves 21 of the opening edge portions of the front bracket 1 and the rear bracket 2 from two axial directions, and the stator 8 is pressed and held by the case 3 by fastening through bolts 24 that have been passed through the bolt apertures 22a into the threaded apertures 23a. Here, outer circumferential edge portions of the two axial end surfaces of the stator core 15 are placed in close contact with the axial surfaces 21a of the receiving grooves 21 around their entire circumference by constraining forces that include thrust F and reaction R due to the fastening force of the through bolts 24. Two axial end edge portions of the outer circumferential surface of the stator core 15 also engage with the radial surfaces 21b of the receiving grooves 21 such that radial movement is restricted.

Next, a method for assembling the stator 8 will be explained with reference to FIGS. 5 through 10.

Figure 5:
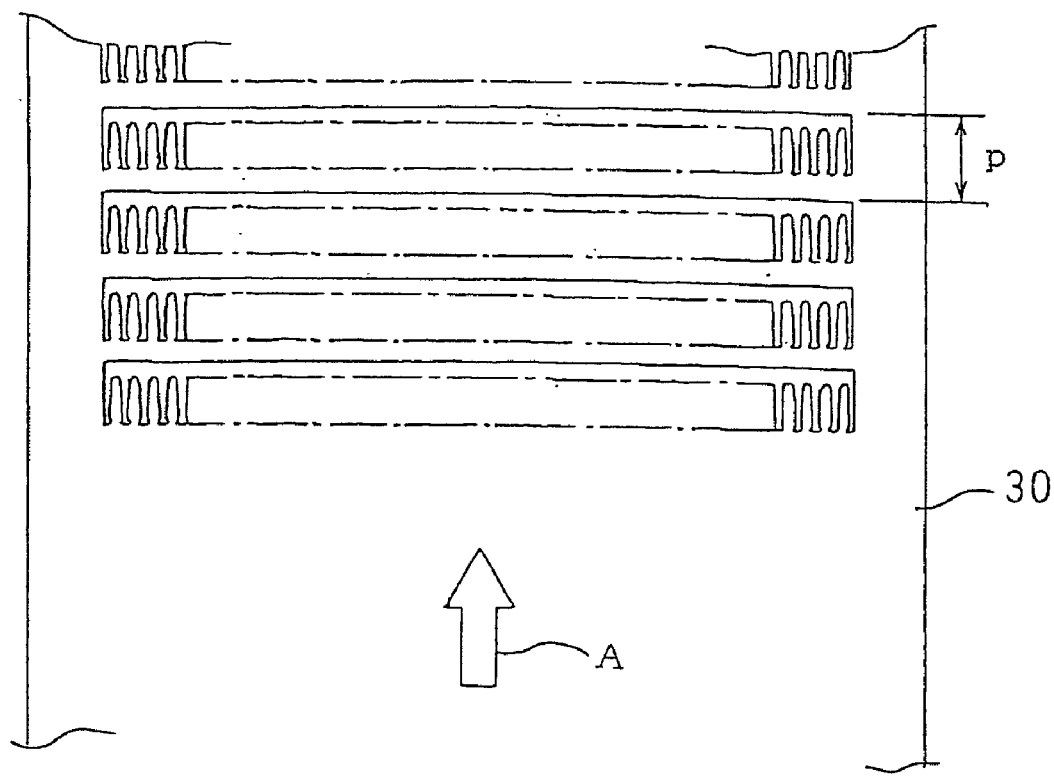
FIG. 5 is a diagram that explains a step of pressing thin strip-shaped magnetic plates in a stator manufacturing method that can be used in the automotive alternator according to Embodiment 1 of the present invention.
Figure 6:
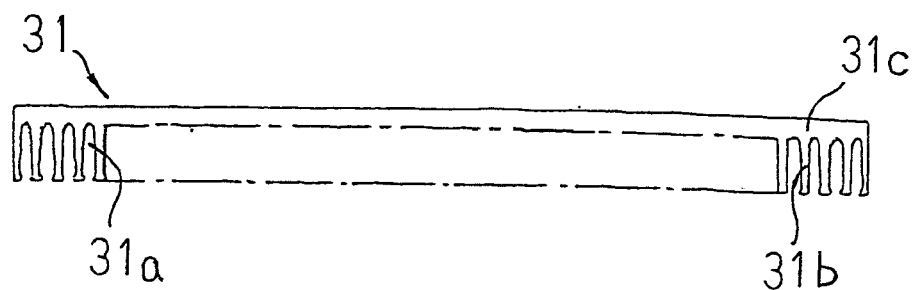
FIG. 6 is a plan that shows a thin strip-shaped magnetic plate that is obtained in a stator manufacturing process that can be used in the automotive alternator according to Embodiment 1 of the present invention.

First, thin strip-shaped magnetic plates 31 are punched at a pitch p while moving a rolled steel plate 30 that has a plate thickness of 0.3 mm, for example, in the direction of arrow A, as shown in FIG. 5. As shown in FIG. 6, the thin strip-shaped magnetic plates 31 have a flat rectangular shape, and tooth portions 31b are formed so as to project outward from a core back portion 31c in a first width direction at a predetermined pitch in a longitudinal direction. Thus, slot portions 31a are formed between the tooth portions 31b so as to be open in the first width direction of the thin strip-shaped magnetic plates 31. Widths of the tooth portions 31b at first and second longitudinal end portions are half the width of other tooth portions 31b. Lengths of the thin strip-shaped magnetic plates 31 match a circumferential length of the stator core 15.

Figure 7:
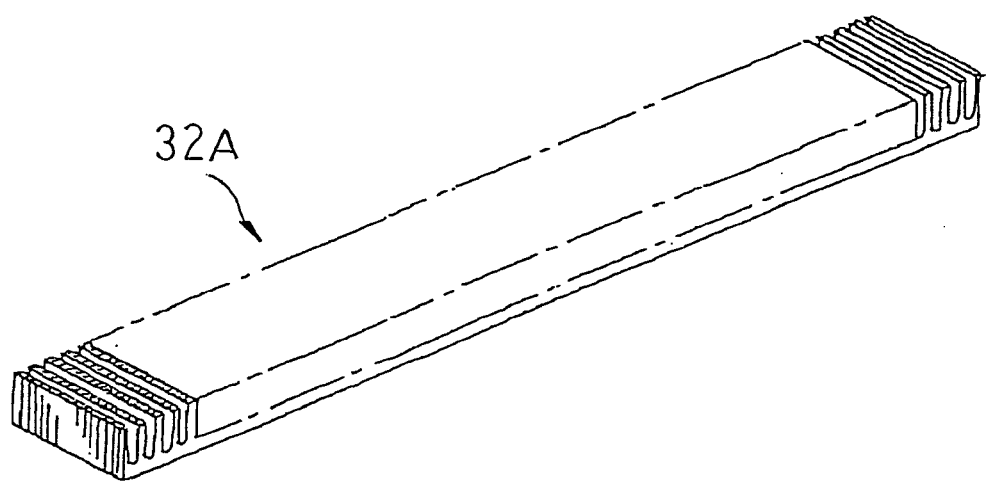
FIG. 7 is a perspective that shows a laminated body of thin strip-shaped magnetic plates that is obtained in the stator manufacturing process that can be used in the automotive alternator according to Embodiment 1 of the present invention.
Figure 8:
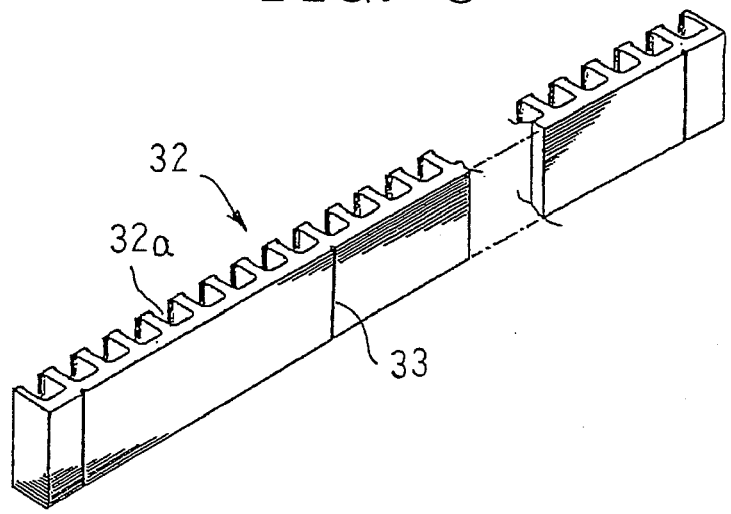
FIG. 8 is a perspective that shows a rectangular parallelepiped laminated core that is obtained in the stator manufacturing process that can be used in the automotive alternator according to Embodiment 1 of the present invention.

Next, a rectangular parallelepiped laminated body 32A that is shown in FIG. 7 is prepared by laminating the punched thin strip-shaped magnetic plates 31 to a thickness equal to an axial thickness of the stator core 15 such that the slot portions 31a, the tooth portions 31b, and the core back portions 31c are stacked on top of each other. Next, the laminated thin strip-shaped magnetic plates 31 are integrated by laser welding, for example, outer wall surfaces of the core back portions 31c of the thin strip-shaped magnetic plates 31 from a first end to a second end in a direction of lamination of the laminated body 32A at positions that divide a longitudinal direction of the laminated body 32A into four equal sections, for example. The laminated thin strip-shaped magnetic plates 31 are also integrated by laser welding, for example, the outer wall surfaces of the core back portions 31c of each of the thin strip-shaped magnetic plates 31 from a first end to a second end in the direction of lamination of the laminated body 32A at positions that face second tooth portions 31b from first and second longitudinal ends of the laminated body 32A. Thus, as shown in FIG. 8, a rectangular parallelepiped laminated core 32 is prepared by integrating the laminated thin strip-shaped magnetic plates 31 using five thin-plate consolidating weld portions 33.

Figure 9:
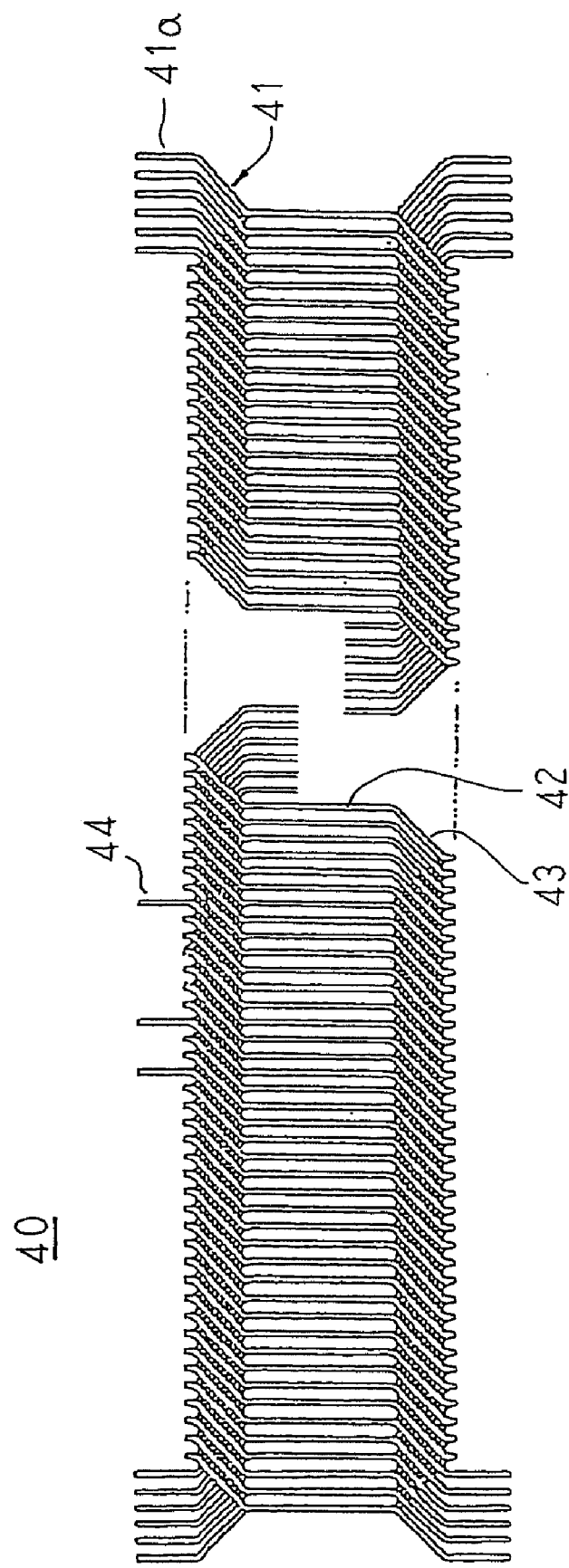
FIG. 9 is a side elevation that shows a winding assembly that is obtained in the stator manufacturing process that can be used in the automotive alternator according to Embodiment 1 of the present invention.

A winding assembly 40 that is shown in FIG. 9 is also prepared. The winding assembly 40 is prepared by supplying twelve continuous conductor wires 41 simultaneously and continuously to a winding forming apparatus (not shown), the conductor wires 41 being formed by coating copper wires that have circular cross sections with insulation, for example. The twelve continuous conductor wires 41 are arrayed at a pitch of one slot and simultaneously bent and formed by the winding forming apparatus. This winding assembly 40 is configured such that pairs of straight slot-housed portions 42 that are adjacent in a direction that is perpendicular to the surface of the page in FIG. 9 are equal in number to the number of slots and are arrayed at a pitch of one slot, and end portions of slot-housed portions 42 that are six slots apart are linked to each other by return portions 43.

Here, if we designate the pairs of slot-housed portions 42 in FIG. 9 as being constituted by upper-layer slot-housed portions 42 and lower-layer slot-housed portions 42, then each of the continuous conductor wires 41 is configured so as to have a wave shape in which upper-layer slot-housed portions 42 and lower-layer slot-housed portions 42 that are separated by six slots are linked alternately at upper ends and lower ends by the return portions 43. Six end portions 41a of the twelve continuous conductor wires 41 project outward on each of two sides at two ends of the winding assemblies 40. During this bending and forming, conductor end portions 44 that will be formed by bending in a subsequent step are extended outward from the return portions 43 of the winding assembly 40 by increasing the supply of the continuous conductor wires 41 in question at predetermined points in time.

Next, the insulators 17 are mounted into respective slot portions 32a of the rectangular parallelepiped laminated core 32. Three winding assemblies 40 that have been configured in this manner are mounted by housing the pairs of slot-housed portions 42 inside the respective slot portions 32a of the rectangular parallelepiped laminated core 32 so as to be stacked in three layers in a slot depth direction.

Figure 10:
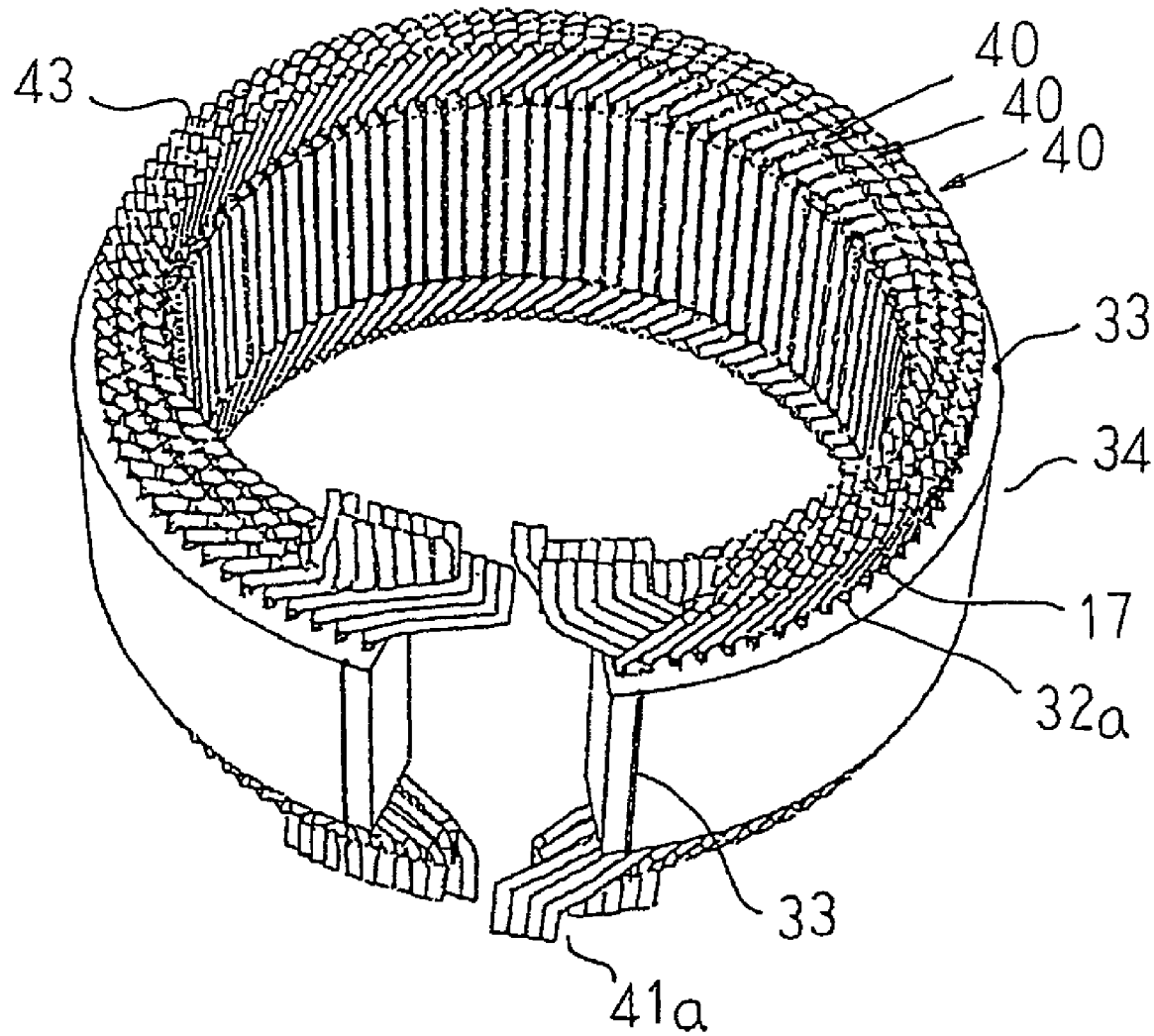
FIG. 10 is a perspective that explains a step of bending the laminated core in the stator manufacturing method that can be used in the automotive alternator according to Embodiment 1 of the present invention.

Next, a laminated core 34 is obtained by bending the laminated core 32 to which the winding assembly 40 has been mounted into a cylindrical shape such that the openings of the slot portions 32a face inward, as shown in FIG. 10. Next, a cylindrical stator core 15 is obtained by abutting two end surfaces of the bent laminated core 34 and integrating them by welding outer portions of the abutted portion 46 using laser welding, for example.

The end portions 41a of the continuous conductor wires 41 that extend from the two sides at the two ends of the winding assemblies 40 extend outward at two axial ends of the abutted portions 46 of the stator core 15 so as to be adjacent to each other. The end portions 41a of the continuous conductor wires 41 are then connected to each other to form ancillary connection portions 45 at the two axial ends of the abutted portions 46. Next, the stator coil 16 that is shown in FIG. 2 is formed by connecting the conductor end portions 44. The stator coil 16 is constituted by two three-phase alternating-current windings 160 that are formed by wye-connecting three phase windings 161. The phase windings 161 are constituted by six windings that are wound into wave windings in which continuous conductor wires 41 are turned around outside the slots 15a at end surfaces of the stator core 15 so as to alternately occupy an inner layer and an outer layer in a slot depth direction inside every sixth slot 15a. Thus, the return portions 43 in which continuous conductor wires 41 are turned around outside the slots 15a at the end surfaces of the stator core 15 are arrayed neatly at two axial ends of the stator core 15 at a pitch of one slot circumferentially so as to form three rows radially and constitute coil ends 16a of the stator coil 16.

In a stator core 15 that has been prepared in this manner, the slot portions 31a, the tooth portions 31b, and the core back portions 31c of the thin strip-shaped magnetic plates 31 overlap axially to constitute slots 15a, teeth 15b, and a core back 15c.

In an automotive alternator 100 that is configured in this manner, electric current is supplied from a battery 25 through the brushes 10 and the slip rings 9 to the field winding 18. Magnetic flux is thereby generated, magnetizing the first pole core 19 into North-seeking (N) poles, and magnetizing the second pole core 20 into South-seeking (S) poles. At the same time, the pulley 5 is driven to rotate by the engine, rotating the rotor 6 together with the shaft 4. A rotating magnetic field is thereby applied to the stator coil 16, generating an electromotive force. This alternating-current electromotive force passes through the rectifiers 12 so as to be converted into direct current, and the magnitude of its voltage is also adjusted by the regulator 14, and the battery 25 is charged.

The fans 7 are rotated synchronously with the rotation of the rotor 6. Thus, air is sucked into the case 3 through air intake apertures 1a and 2a that are formed on the end surfaces of the front bracket 1 and the rear bracket 2. The air that has been sucked into the case 3 flows axially to the rotor 6, is deflected centrifugally by the fans 7, and is discharged externally through air discharge apertures 1b and 2b that are formed on side surfaces of the front bracket 1 and the rear bracket 2 in close proximity to the coil ends 16a of the stator coil 16. Heat-generating parts such as the rectifiers 12, the regulator 14, and the stator coil 16, etc., are cooled by this flow of air.

Now, in the automotive alternator 100, closed magnetic circuits are formed in which magnetic flux that has left the first pole core 19 that has been magnetized into North-seeking (N) poles enters the teeth 15b of the stator core 15 across the air gap between the rotor 6 and the stator 8, enters adjacent teeth 15b through the core back 15c, and enters the second pole core 20 that has been magnetized into South-seeking (S) poles across the air gap. Here, the amount of magnetic flux that flows through the magnetic circuit and determines alternator output is determined by the magnetomotive force of the rotating magnetic field from the rotor 6 and the magnetic resistance of the magnetic circuit. In Embodiment 1, because the outer circumferential surface of the stator core 15 is formed so as to have a cylindrical shape, compared to conventional stator cores in which recess portions for allowing passage of through bolts are formed on the outer circumferential surface, magnetic path cross-sectional area at the core back 15c in the magnetic circuit is increased by an amount proportionate to the eliminated recess portions, reducing magnetic resistance and enabling output to be increased.

Because the two end surfaces of the stator core 15 are pressed and held between the axial surfaces 21a of the receiving grooves 21 of the front bracket 1 and the rear bracket 2 by the fastening force of the through bolts 24, the two end surfaces of the stator core 15 and the axial surfaces 21a can be placed in a state of close contact even if the end surfaces of the stator core 15 do not have complete flatness, and even if the axial surfaces 21a are not completely parallel to the end surfaces of the stator core 15. Thus, even if salt water, mud, etc., enters through the air discharge apertures 1b and 2b, as indicated by arrow B in FIG. 4, it cannot penetrate between the end surfaces of the stator core 15 and the axial surfaces 21a. Thus, the occurrence of insulation failure that results from salt water, mud, etc., accumulating in the interfitting portions that are in close proximity to the coil ends 16a (the interfitting portions between the end surfaces of the stator core 15 and the axial surfaces 21a) can be suppressed.

Minute gaps also arise between the outer circumferential surfaces of the stator core 15 and the radial surfaces 21b of the receiving grooves 21. However, as shown in FIG. 4, the distance δ between the coil ends 16a and the interfitting portions between the outer circumferential surface of the stator core 15 and the radial surfaces 21b is significantly greater than the distance between the coil ends 16a and the interfitting portions between the end surfaces of the stator core 15 and the axial surfaces 21a. Thus, even if salt water, mud, etc., accumulates in the interfitting portion between the outer circumferential surface of the stator core 15 and the radial surfaces 21b and accelerates oxidation of the stator core 15, leak paths will not be formed between the case 3 and the coil ends 16a.

Because the stator core 15 is prepared by laminating, integrating, and simultaneously bending the thin strip-shaped magnetic plates 31 into a cylindrical shape, and welding the abutted portion 46, a stator core 15 that has a highly-precise degree of cylindricalness can be obtained. At the same time, gaps are less likely to arise between the thin strip-shaped magnetic plates 31 that constitute the stator core 15, preventing salt water, mud, etc., from penetrating between the thin strip-shaped magnetic plates 31.

The phase windings 161 that constitute the stator coil 16 are constituted by six windings that are wound into wave windings in which continuous conductor wires 41 are turned around outside the slots 15a at end surfaces of the stator core 15 so as to alternately occupy an inner layer and an outer layer in a slot depth direction inside every sixth slot 15a. The return portions 43 that are turned around outside the slots 15a at the end surfaces of the stator core 15 are thereby arrayed neatly at two axial ends of the stator core 15 at a pitch of one slot circumferentially so as to form three rows radially and constitute coil ends 16a of the stator coil 16. Thus, because the external shape of the coil ends 16a is configured so as to be uniform in a circumferential direction, the distance between the coil ends 16a and the case 3 can be kept constant, increasing dielectric strength of the coil ends 16a.

Because the stator core 15 is prepared by laminating thin strip-shaped magnetic plates 31 that are not covered with an insulating coating, the end surfaces of the stator core 15 and the axial surfaces 21a of the receiving grooves 21 contact each other at metal surfaces. In addition, the end surfaces of the stator core 15 and the axial surfaces 21a are in a close state due to the fastening force of the through bolts 24. Thus, contact thermal resistance between the end surfaces of the stator core 15 and the axial surfaces 21a is significantly reduced. Because heat that has been generated by the stator coil 16 is thereby transferred efficiently through the stator core 15 to the case 3 and is radiated from the surface of the case 3, which has a large surface area, temperature increases in the stator 8 can be suppressed.

In the automotive alternator 100, there is a possibility that power generation may fail due to ground floating. The contact area in the screwed-together portions between the through bolts 24 and the threaded apertures 23a is small, and if salt water, mud, etc., enters the screwed-together portions, electrical conductivity in the screwed-together portions is reduced, becoming a factor in ground floating. Thus, the automotive alternator 100 is mounted by fastening mounting flange portions 26 and 27 that are disposed on the front bracket 1 and the rear bracket 2 to a vehicle grounding portion 28 using mounting bolts (not shown). The front bracket 1 and the rear bracket 2 are thereby reliably grounded, preemptively preventing the occurrence of ground floating.

Figure 11:
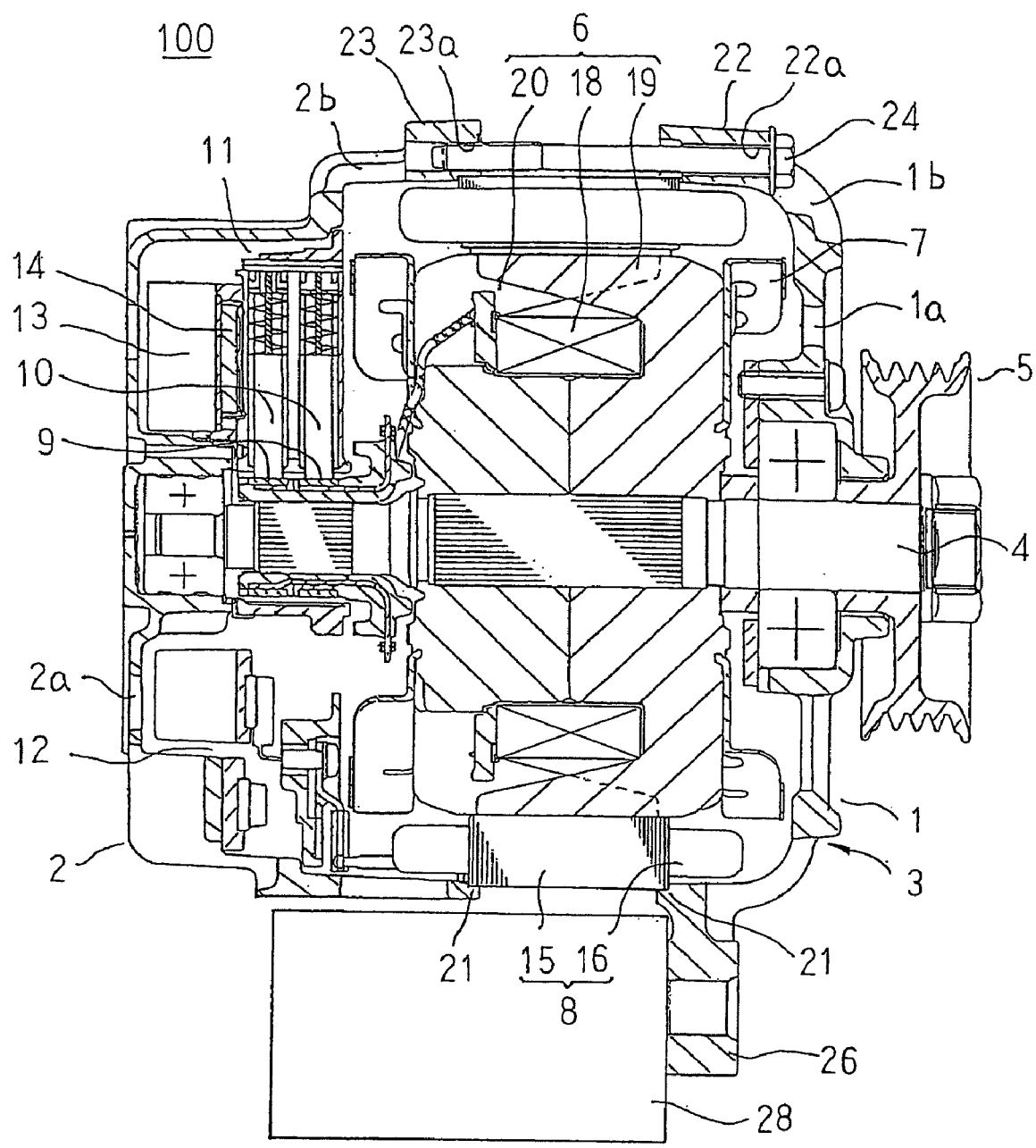
FIG. 11 is a longitudinal section that shows a preferred variation of the automotive alternator according to Embodiment 1 of the present invention.

In Embodiment 1, because the stator core 15 is prepared by laminating thin strip-shaped magnetic plates 31 that are not covered with an insulating coating, and the stator core 15 is pressed and held between the case 3 by the fastening force of the through bolts 24, salt water, mud, etc., will not penetrate between the thin strip-shaped magnetic plates 31, or between the stator core 15 and the axial surfaces 21*a*, ensuring satisfactory electrical conductivity. Thus, because the front bracket 1 and the rear bracket 2 are reliably electrically connected through the stator core 15, it is not necessary to mount both of the mounting flange portions 26 and 27 to the vehicle grounding portion 28, enabling the degree of installation freedom of the automotive alternator 100 to be increased. For example, as shown in FIG. 11, the mounting flange portion 27 may also be eliminated, and the mounting flange portion 26 that is disposed on the front bracket 1 may be fastened to the vehicle grounding portion 28 using a mounting bolt (not shown). In that case, it is not necessary to connect ground wiring to the rear bracket 2, facilitating routing of vehicle wiring.

Embodiment 2

Figure 12:
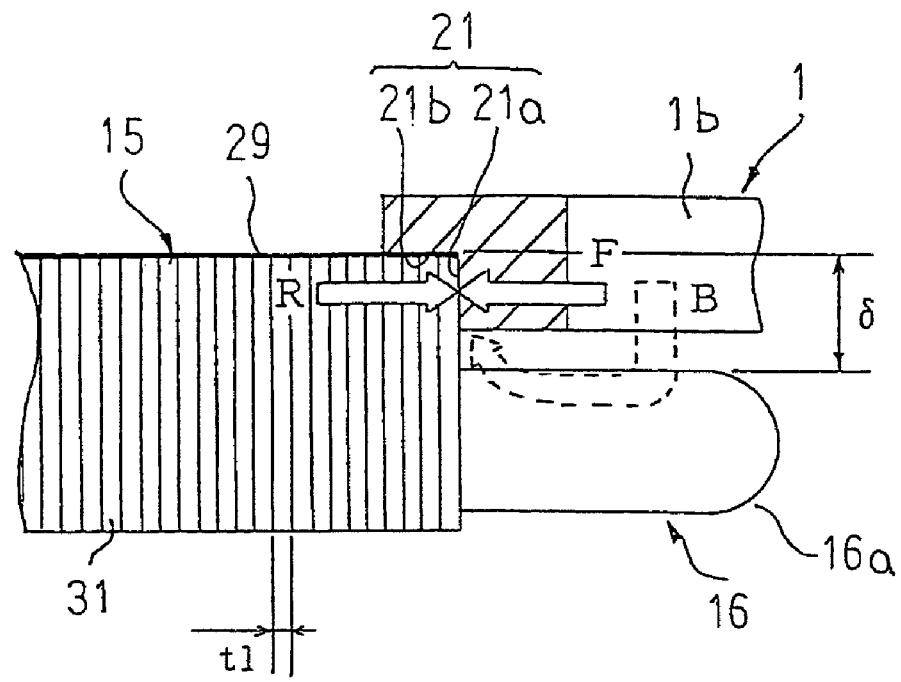
FIG. 12 is a partial cross section that explains a stator fixing construction in an automotive alternator according to Embodiment 2 of the present invention.

FIG. 12 is a partial cross section that explains a stator fixing construction in an automotive alternator according to Embodiment 2 of the present invention.

In FIG. 12, an insulating coating 29 is coated onto an outer circumferential surface of a stator core 15.

Moreover, the rest of this embodiment is configured in a similar manner to Embodiment 1 above.

In Embodiment 2, a rectangular parallelepiped laminated core 32 is prepared in a similar manner to Embodiment 1 above, by laminating and integrating thin strip-shaped magnetic plates 31, and a stator core 15 is prepared by bending into a cylindrical shape the laminated core 32 into which a winding assembly 40 has been mounted, and abutting and welding two end surfaces of the laminated core 34 that has been bent into the cylindrical shape. Next, an insulating resin that is constituted by an epoxy resin, for example, is applied to an outer circumferential surface of the stator core 15 to prepare a stator core 15 in which an entire surface of the outer circumferential surface has been coated with an insulating coating 29.

Now, if the insulating coating 29 is not coated onto the outer circumferential surface of the stator core 15, metal surfaces of the stator core 15 are exposed at the interfitting portions between the outer circumferential surface of the stator core 15 and the radial surfaces 21*b* of the receiving grooves 21. Thus, oxidation of the stator core 15 is accelerated if salt water, mud, etc., accumulates between the outer circumferential surface of the stator core 15 and the radial surfaces 21*b*. If oxides of the stator core 15 are formed between the outer circumferential surface of the stator core 15 and the radial surfaces 21*b*, the stator core 15 may be pressed radially inward, and in the worst cases, the stator core 15 may be displaced radially inward, and circumstances may arise in which the stator core 15 interferes with the rotor 6.

In Embodiment 2, because metal surfaces of the stator core 15 are not exposed at the interfitting portions between the outer circumferential surface of the stator core 15 and the radial surfaces 21*b* of the receiving grooves 21, even if salt water, mud, etc., accumulates between the outer circumferential surface of the stator core 15 and the radial surfaces 21*b* of the receiving grooves 21, oxidation of the stator core 15 is suppressed. Consequently, interference between the stator core 15 and the rotor 6 that results from oxides of the stator core 15 forming at the interfitting portions between the outer circumferential surface of the stator core 15 and the radial surfaces 21*b* can be prevented preemptively.

Moreover, in Embodiment 2 above, the insulating coating 29 is coated so as to cover the entire surface of the outer circumferential surface of the stator core 15, but the insulating coating 29 need only be formed such that at least regions of the outer circumferential surface of the stator core 15 that face the radial surfaces 21*b* of the receiving grooves 21 are covered.

Embodiment 3

Figure 13:
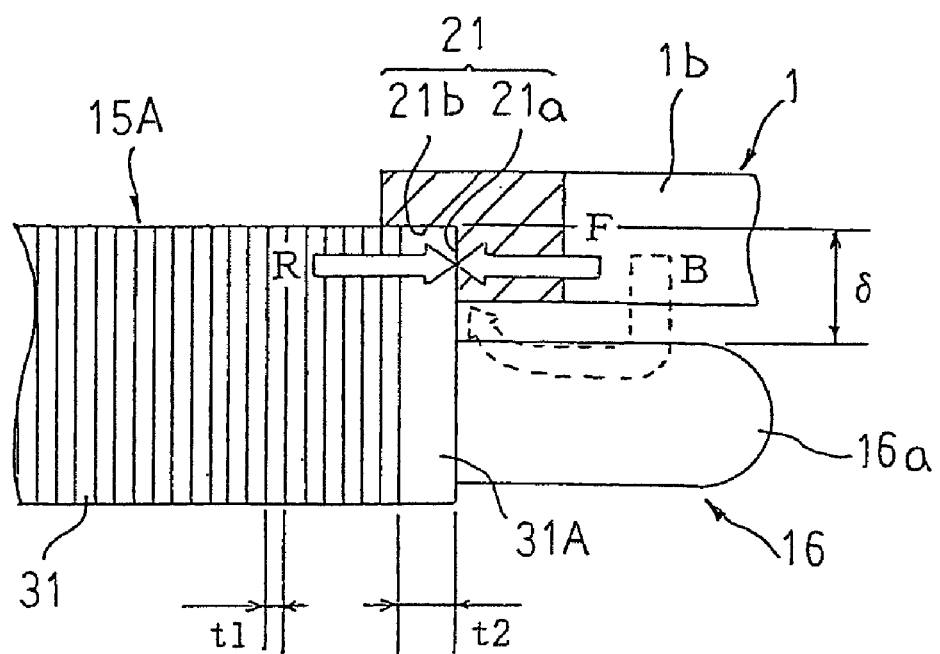
FIG. 13 is a partial cross section that explains a stator fixing construction in an automotive alternator according to Embodiment 3 of the present invention.

FIG. 13 is a partial cross section that explains a stator fixing construction in an automotive alternator according to Embodiment 3 of the present invention.

In FIG. 13, a stator core 15A is prepared by laminating a predetermined number of thin strip-shaped magnetic plates 31 that have a plate thickness (t1) of 0.3 mm, for example, and also laminating thin strip-shaped magnetic plates 31A that have a plate thickness (t2) of 1.0 mm, for example, on two ends of the laminated body of thin strip-shaped magnetic plates 31, integrating the laminated body of thin strip-shaped magnetic plates 31 and 31A by welding it, then bending it into a cylindrical shape, and welding abutted portions of two end surfaces.

Moreover, the rest of this embodiment is configured in a similar manner to Embodiment 1 above.

In Embodiment 3, because the thin strip-shaped magnetic plates 31A that are constituted by thick plates are disposed on the two ends of the laminated body that is bent into a cylindrical shape, rigidity of the laminated body is increased. Thus, buckling phenomena that arise on the two end surfaces as the laminated body is being bent into the cylindrical shape are suppressed. The degree of flatness of the two end surfaces of the stator core 15A is thereby increased, enabling the end surfaces of the stator core 15A and the axial surfaces 21*a* of the receiving grooves 21 to be placed in close contact without gaps. Thus, the occurrence of insulation failure that results from salt water, mud, etc., accumulating between the end surfaces of the stator core 15A and the axial surfaces 21*a* can be further suppressed.

Now, if salt water, mud, etc., accumulates between the outer circumferential surface of the stator core 15 and the radial surfaces 21*b* of the receiving grooves 21 and oxidation of the stator core 15 is accelerated, oxides of the stator core 15A may be formed between the outer circumferential surface of the stator core 15A and the radial surfaces 21*b*. Formation of these oxides of the stator core 15A acts so as to press the stator core 15A radially inward. In Embodiment 3, because the thin strip-shaped magnetic plates 31A that are constituted by thick plates are disposed on the two ends of the stator core 15A, rigidity of the stator core 15A against radial displacement is increased. Thus, even if oxides of the stator core 15A are formed between the outer circumferential surface of the stator core 15A and the radial surfaces 21*b*, displacement to the radially-inner side of the stator core 15A is stopped, preventing interference between the rotor 6 and the stator core 15A.

Moreover, in Embodiment 3 above, the thin strip-shaped magnetic plates 31A that are constituted by thick plates are disposed on two axial ends of the stator core 15A, but it is not absolutely necessary for thin strip-shaped magnetic plates 31A that are constituted by thick plates to be disposed on the two axial ends of the stator core 15A, and a single thin strip-shaped magnetic plates 31A that is constituted by a thick plate may also be disposed only on one axial end of the stator core 15A.

In each of the above embodiments, fans are disposed on two axial ends of the rotor, but it is not absolutely necessary for fans to be disposed on the two axial ends of the rotor, and a fan may also be disposed only at the rear end of the rotor, for example. In that case, the air intake apertures and the air discharge apertures need only be formed on at least the rear bracket.

In each of the above embodiments, the present invention is explained as it applies to automotive alternators, but similar effects are also exhibited if the present invention is applied to other dynamoelectric machines such as automotive generator-motors, automotive alternating-current motors, etc.

In each of the above embodiments, the present invention is explained as it applies to automotive alternators in which the stator slots are prepared at a ratio of two slots per phase per pole, but the present invention can be applied to any automotive alternator in which stator slots are prepared at a ratio of n slots per phase per pole (where n is an integer greater than or equal to 2).

In each of the above embodiments, the stator coil is constituted by two three-phase alternating-current windings, but the stator coil may also be constituted by a single three-phase alternating-current winding. The three-phase alternating-current windings are configured by wye-connecting three phase windings, but the three-phase alternating-current windings may also be configured by delta-connecting three phase windings.

What is claimed is:

1. A dynamoelectric machine comprising:
   a stator comprising:
      a cylindrical stator core in which slots that open radially inward are arrayed circumferentially; and
      a stator coil that is installed in said slots;
   a pair of frames that are each formed so as to have a bowl shape, and in each of which a receiving groove is formed around an entire circumference on an inner circumference of an opening of said bowl shape, outer circumferential portions at two axial ends of said stator core fitting together with said receiving grooves so as to be held therebetween;
   a rotor that is disposed inside said stator core so as to be coaxial with said stator core and that is rotatably supported by said pair of frames;
   a plurality of through bolts that are arrayed circumferentially radially outside said stator core so as to have an axial direction that is parallel to a central axis of said stator core, and that fasten and integrate said pair of frames that hold said stator core; and
   a cooling fan that is fixed to at least one axial end surface of said rotor, an air intake aperture being disposed through an end surface of said pair of frames near said cooling fan, and an air discharge aperture being disposed through a side surface of said pair of frames near said cooling fan,
   wherein:
   said stator core is configured by laminating and integrating thin magnetic plates that are not covered with an insulating coating, and has an outer circumferential surface that has a cylindrical surface;
   said receiving groove is constituted by:
      an annular axial surface that is constituted by a flat surface that is perpendicular to said central axis of said stator core; and
      a radial surface that is constituted by a cylindrical surface that is centered around said central axis;
   metal surfaces of said thin magnetic plates at two axial ends of said stator core are held between each of said axial surfaces of said pair of frames in a state of close contact around an entire circumference;
   said outer circumferential surface that has the cylindrical surface is exposed outside; and
   either of said frames is fastened to a vehicle grounding portion.

2. A dynamoelectric machine according to claim 1, wherein a plate thickness of at least one of said thin magnetic plates that is positioned at an axial end of said stator core is thicker than a plate thickness of a remainder of said thin magnetic plates.

3. A dynamoelectric machine according to claim 1, wherein an insulating coating is coated onto portions of said outer circumferential surface of said stator core that fit together with said radial surfaces.

4. A dynamoelectric machine according to claim 1, wherein said stator core is formed so as to be cylindrical by abutting two end portions of a laminated body of said thin magnetic plates and has an abutted portion that extends in said axial direction.

5. A dynamoelectric machine according to claim 1, wherein said stator coil comprises a plurality of windings in each of which a continuous wire is installed so as to be turned around outside said slots near end surfaces of said stator core and so as to alternately occupy an inner layer and an outer layer in a slot depth direction inside said slots at a predetermined slot interval.

* * * * *